United States Patent [19]

Draghi et al.

[11] Patent Number: 5,735,448
[45] Date of Patent: Apr. 7, 1998

[54] METHOD OF REPAIRING SURFACE AND NEAR SURFACE DEFECTS IN SUPERALLOY ARTICLES SUCH AS GAS TURBINE ENGINE COMPONENTS

[75] Inventors: Peter J. Draghi, Simsbury; Norman Pietruska, Durham; Wayne K. Armstrong, Meriden, all of Conn.

[73] Assignee: United Technologies Corporation, Hartford, Conn.

[21] Appl. No.: 740,147

[22] Filed: Oct. 22, 1996

Related U.S. Application Data

[60] Continuation of Ser. No. 416,428, Apr. 4, 1995, abandoned, which is a division of Ser. No. 192,242, Feb. 7, 1994, Pat. No. 5,437,737.

[51] Int. Cl.$^6$ .................. B23K 35/14; B23K 1/008
[52] U.S. Cl. .................. 228/119; 228/194; 228/248.1
[58] Field of Search .................. 228/119, 194, 228/248.1

[56] References Cited

U.S. PATENT DOCUMENTS

| | | | |
|---|---|---|---|
| 3,620,693 | 11/1971 | Sama et al. | 428/553 |
| 4,008,844 | 2/1977 | Duvall et al. | 228/119 |
| 4,073,639 | 2/1978 | Duvall et al. | 75/0.5 R |
| 4,475,959 | 10/1984 | Liang et al. | 148/24 |
| 4,614,296 | 9/1986 | Lesgourgues | 228/119 X |
| 4,705,203 | 11/1987 | McComas et al. | 228/119 |
| 4,726,101 | 2/1988 | Draghi et al. | 29/156.8 B |
| 5,071,054 | 12/1991 | Dzugan et al. | 228/119 |
| 5,156,321 | 10/1992 | Liburdi et al. | 228/119 |
| 5,182,080 | 1/1993 | Beltran et al. | 420/588 |
| 5,240,491 | 8/1993 | Budinger et al. | 75/255 |
| 5,263,641 | 11/1993 | Rafferty et al. | 228/220 |

FOREIGN PATENT DOCUMENTS

| | | | |
|---|---|---|---|
| 0 353 843 | 2/1990 | European Pat. Off. | B23K 35/30 |
| 2 511 908 | 3/1983 | France | B23K 1/19 |
| WO 93/22097 | 11/1993 | WIPO | B23K 35/30 |

*Primary Examiner*—Kenneth J. Ramsey
*Attorney, Agent, or Firm*—Brooks, Haidt, Haffner & Delahunty

[57] ABSTRACT

A repair coating for superalloy articles, such as gas turbine engine components, includes a volatile organic carrier or water-based carrier, a fluxing agent, a thickening agent, balance a filler mix. The filler mix consists of at least two distinct particulate components. The mix includes a first particulate component having a composition which approximates that of the article being repaired. The mix also includes a second particulate component having a composition approximating that of the article and a melting point depressant, such as boron. This melting point depressant is substantially in excess of that in the article and sufficient to provide melting of a portion of the mix at a processing temperature below the melting temperature of the article. The above filler mix is blended with the other constituents to form the repair coating which is applied to an article. A series of heating/cooling cycles is performed to ensure that the repair cooling properly melts, wets, and bonds to the article and that the melting point depressant diffuses into the article.

3 Claims, No Drawings

METHOD OF REPAIRING SURFACE AND NEAR SURFACE DEFECTS IN SUPERALLOY ARTICLES SUCH AS GAS TURBINE ENGINE COMPONENTS

This is a continuation of Ser. No. 08/416,428, filed on Apr. 4, 1995, now abandoned, which is a division of Ser. No. 08/192,242, filed on Feb. 7, 1994, now U.S. Pat. No. 5,437,737.

TECHNICAL FIELD

The present invention relates to a method of repairing surface and near-surface defects in superalloy articles, such as gas turbine engine components.

BACKGROUND ART

Gas turbine engines are a primary source of power for aircraft propulsion. The main components of a gas turbine engine include a compressor section, a combustor section and a turbine section. Stationary vanes, disposed between rings of moving blades within the turbine section, direct and stabilize gas flow from one stage of moving blades to the next. The stabilization of gas flow optimizes the amount of work extracted from hot gases in the turbine section.

The severe operating conditions under which portions of a gas turbine engine operates cause component surfaces to deteriorate. Exposure to the hot gases causes deterioration due to cracking, corrosion, oxidation, and erosion. The high temperature and pressure under which a gas turbine engine operates also cause creep distortion of turbine blades and vanes. As a result, turbine efficiency is lost and the vanes and blades must be repaired or replaced. Due to the high cost of these engine components, it is desirable to repair the components for subsequent use rather than replace them. Repairing the components, however, may result in additional component surface degradation due to the effects of removing surface contamination and/or protective coatings in the repair process. Conventionally, the vanes and blades may be treated with HF gas to remove oxides from damaged areas. Other acid treatments and mechanical abrasion techniques may also be used for cleaning. The above cleaning techniques, however, may erode component surfaces and result in additional component defects.

In the prior art, many attempts have been made to repair defects in these engine components. For example, fusion welding has been used to repair cracks and other defects, however, additional cracking has often occurred related to rapid heating and cooling. Brazing techniques have also been employed to repair defective areas. Difficulties encountered with this technique and variations thereof include the inability to completely remove contamination in the cracks and inability to completely fill narrow cracks with braze material.

Another repair process is described in U.S. Pat. No. 4,008,844, which is assigned to the present assignee and incorporated herein by reference. According to this patent, a mixture of metal powders is made from two powders with different compositions. One composition approximates that of the superalloy to be repaired while the other composition also approximates that of the superalloy to be repaired, but contains a melting point depressant, usually boron. The mix has a paste like consistency. The defect to be repaired is filled with a mixture of these powders and then heated to a temperature at which the boron containing powder melts, but the boron-free powder and the substrate do not. Solidification then occurs isothermally over a period of time as the boron diffuses into the substrate thereby raising the solidification temperature of the melted constituent. This process is successful, but is limited in that it is difficult to apply exactly the right amount of material to shallow surface defects. In addition, when larger defects are to be covered or filled, the excess molten tends to flow away from the defect during the heat treatment process.

Accordingly, there exists a need for a more controlled surface repair coating applicable to superalloy articles, such as gas turbine engine components.

The objects of the present invention are to (1) provide a surface build-up repair coating applicable to superalloy articles, such as gas turbine engine components, and (2) provide a repair process particularly suited for repairing cracks and shallow crevices in superalloy articles, such as engine components, so that minimal or no subsequent grinding or buffing steps are required to return the article to its proper dimensions.

DISCLOSURE OF INVENTION

According to the present invention a repair coating suitable for the repair of superalloy articles, such as gas turbine components, is disclosed. Superalloy articles specifically refer to nickel and cobalt based alloys. The repair coating comprises between about 20 weight percent and about 60 weight percent volatile aqueous or organic carrier, up to about 8 weight percent fluxing agent, up to about 5 weight percent thickening agent, balance a metallic filler mix. If a commercial water-based carrier is used, the thickening agent may not be necessary because the carrier will usually include a thickening agent and be sufficiently viscous. Similarly, the fluxing agent may not be necessary if the surface of the article can be sufficiently cleaned to have minimal or no surface oxides. Flow time for the repair coating may be between about 10 seconds and about 40 seconds measured using a Number 5 Zahn Cup.

The volatile organic carrier may be any commercially available carrier that is volatile at room temperature in combination with a thickening agent. For example, the carrier may be methyl alcohol, ethyl alcohol, or ether. The water-based carrier may be a gel binder such as Nicrobraz Cement-S, which is manufactured by Wall Colmonoy Corporation, Madison Heights, Mich. Nicrobraz Cement-S, which is non-flammable, odor-free, and non-toxic, is a suspension agent that can be mixed with a brazing filler metal powder to produce a thixotropic substance. Alternatively, water may be used in conjunction with a suitable thickening agent.

The thickening agent may be any substance capable of congealing the repair coating such as starches, gums, casein, gelatin, and phycocolloids; semisynthetic cellulose derivatives; and polyvinyl alcohol and carboxyvinylates. Specifically, cellulose ether, 2-hydroxy propyl ether, methyl cellulose, ethyl cellulose, hydroxy propyl cellulose, or ethylene glycol monoethyl ether may be used.

The fluxing agent is an activator that serves as a wetting/cleansing agent and is capable of dissolving residual surface oxides. The fluxing agent includes a halide compound, such as fluorides, bromides, chlorides, or mixtures thereof, to improve the wetting characteristics of the repair coating by breaking down surface oxides that interfere with wetting of the substrate by the repair coating.

The repair coating also contains a metallic filler mix as a major constituent. The filler mix comprises a first, finely-divided homogenous particulate component substantially corresponding in composition to that of the superalloy article and a second, finely-divided homogeneous particulate component having as its base the same base metal as that of the article and containing a melting point depressant, such as boron or silicon or mixtures thereof, in a quantity substantially exceeding that present in the superalloy article.

The first and second particulate components are intimately blended to form a powder mix which has an overall composition approximating that of the superalloy article. The weight ratio of the first particulate component to the second particulate component may be between about 70:30 and about 30:70. The second particulate component of the mix will melt while the balance of the mix remains solid at a processing temperature below the melting point of the article. The mix is characterized by isothermal re-solidification at the processing temperature. The above filler mix is described in U.S. Pat. No. 4,073,639 which is assigned to the present assignee and incorporated herein by reference.

The invention further includes a method of repairing thermal fatigue cracks and cleaning induced surface defects in a superalloy article which comprises the steps of cleaning the surface of the superalloy article by a conventional cleaning process, such as high temperature HF gas cleaning, a mechanical abrasion technique, or a combination thereof. This cleaning step is followed by application of the previously described repair coating to the article so that a thin, uniform adherent film is deposited. The repair coating, which may be applied by brushing, spraying or dipping, comprises the constituents described above. The repair coating may be applied in a single coat or multiple coats, if required. A series of heating/cooling cycles is performed to ensure that the repair coating properly melts, wets, and bonds to the article and that the melting point depressant diffuses into the article.

BEST MODE FOR CARRYING OUT THE INVENTION

The invention will now be described by way of an example which is meant to be exemplary rather than limiting. It was desired to repair shallow surface defects in a turbine vane having a nominal composition, by weight, consisting of 8.4 weight percent Cr, 10 weight percent Co, 0.65 weight percent Mo, 5.5 weight percent Al, 3.0 weight percent Ta, 10.0 weight percent W, 1.4 weight percent Hf, 1.0 weight percent Ti, 0.015 weight percent B, 0.05 weight percent Zr, balance Ni.

A repair coating was prepared with the following constituents.

TABLE I

| Constituent | Weight Percent | |
|---|---|---|
| | Example | Broad |
| Volatile Organic Carrier | 44.3%–48.7% | 40.0%–50.0% |
| Fluxing Agent | 4.5%–5.5% | 3.0%–8.0% |
| Thickening Agent | 3.3%–3.7% | 1.0%–5.0% |
| Filler Mix | Remainder | Remainder |

In the present example, the fluxing agent was lithium fluoride having a particle size less than about 45 microns, the thickening agent was hydroxy propyl cellulose, and the volatile organic carrier was ether. Although ether was used in the present example, it may be more desirable to use a water-based carrier since many volatile organics detrimentally affect the environment.

A metallic filler mix having the following constituents was used.

TABLE II

| Constituent | Weight Percent | |
|---|---|---|
| | Example | Broad |
| First Particulate Component | | |
| Carbon | 0.130%–0.170% | 0.005%–0.250% |
| Chromium | 8.000%–8.800% | 5.100%–15.000% |
| Cobalt | 9.000%–11.000% | 0.000%–20.000% |
| Molybdenum | 0.500%–0.800% | 0.000%–5.000% |
| Tantalum | 2.800%–3.300% | 0.000%–6.000% |
| Tungsten | 9.500%–10.500% | 0.000%–12.000% |
| Titanium | 0.900%–1.200% | 0.000%–4.000% |
| Aluminum | 5.300%–5.700% | 1.000%–5.000% |
| Boron | 0.010%–0.020% | 0.000%–0.050% |
| Hafnium | 1.200%–1.600% | 0.000%–2.000% |
| Zirconium | 0.030%–0.080% | 0.000%–1.000% |
| Nickel | Remainder | Remainder |
| Second Particulate Component | | |
| Chromium | 8.50%–9.50% | 5.00%–15.00% |
| Cobalt | 7.50%–8.50% | 0.00%–20.00% |
| Tungsten | 3.75%–4.25% | 0.00%–12.00% |
| Aluminum | 1.75%–2.25% | 1.00%–5.00% |
| Titanium | 0.00%–0.10% | 0.00%–4.00% |
| Boron | 2.75%–3.25% | 1.00%–4.00% |
| Silicon | 0.00%–0.10% | 0.00%–3.00% |
| Hafnium | 0.75%–1.25% | 0.00%–2.00% |
| Nickel | Remainder | Remainder |

Boron was used as the melting point depressant in the second particulate component of the filler mix because of its capability to rapidly diffuse into the vane. The weight ratio of the second particulate component to the first particulate component was about 60:40. The particle size of the first and second components was less than about 50 microns.

The above filler mix was blended with the TABLE I constituents to form the repair coating. The repair coating had a flow time between about 15 seconds and about 32 seconds using a Number 5 Zahn Cup.

Prior to applying the repair coating to the vane, the surface of the vane was cleaned to remove contamination, as summarized in TABLE III following this detailed description. To clean the vane, it was first heated to about 1,790° F. in the presence of hydrogen. Next a 15.5% volume concentration of HF gas was introduced for about 45 minutes. The flow of gas was then stopped for about 15 minutes. Next the vane was exposed to pure hydrogen for about 15 minutes and the above steps were repeated, beginning with the introduction of HF gas. Another introduction of HF gas for about 45 minutes then followed, holding for about 15 minutes. Next the vane was exposed to pure hydrogen for about 30 minutes and the temperature was increased to about 1,865° F. in about 60 minutes while purging with hydrogen. Additional purging with hydrogen for about 60 minutes followed. The vane was cooled to about 1,290° F. in the presence of hydrogen and further cooled to about 170° F. in the presence of hydrogen. All pressures during the process were essentially ambient. This procedure resulted in the effective removal of contamination, such as oxides, from the surface and from cracks in the vane.

TABLE III

| Temperature (°F.) | Gas Present | Time (minutes) |
|---|---|---|
| 1,790 | $H_2$ | — |
| 1,790 | HF | 45 |
| 1,790 | Flow Stopped | 15 |

TABLE III-continued

| Temperature (°F.) | Gas Present | Time (minutes) |
|---|---|---|
| 1,790 | $H_2$ | 15 |
| 1,790 | HF | 45 |
| 1,790 | Flow Stopped | 15 |
| 1,790 | $H_2$ | 15 |
| 1,790 | HF | 45 |
| 1,790 | Flow Stopped | 15 |
| 1,790 | $H_2$ | 30 |
| 1,865 | $H_2$ | 60 |
| 1,865 | $H_2$ | 60 |
| 1,290 | $H_2$ | — |
| 170 | $H_2$ | — |

The repair coating was then brush applied over shallow defects on the surface of the cleaned vane. Application of the repair coating resembled application of paint. This "paint-like" coating filled in the shallow defects and very fine cracks in the vane that were visually undetectable. The coating was then air dried.

The vane was then placed through a series of heating/cooling cycles, as summarized in TABLE IV, following this detailed description. First, the vane was placed in a vacuum furnace and heated to between about 975° F. and about 1,025° F. at a rate of about 30° F. per minute under a hard vacuum of about $5 \times 10^{-4}$ torr or less. The temperature was held for about 15 minutes to ensure a uniform vane temperature. The temperature was then increased to between about 1,775° F. and about 1,825° F. at a rate of about 20° F. per minute or faster. The temperature was then held for about 10 minutes to ensure uniform vane temperature. Then the temperature was increased to a processing temperature below the melting temperature of the vane such the second particulate component melted while the first particulate component remained solid. Then the temperature was increased to between about 2,185° F. and about 2,215° F. at a rate of between about 10° F. per minute and about 25° F. per minute, holding for about 15 minutes for homogenization and temperature stabilization. The temperature was held to effect isothermal re-solidification of the mix by diffusion of the melting point depressant into the vane and into the first particulate component. This increase in temperature just beyond the melting point of the low melt portion of the repair coating enabled the coating to flow sufficiently and fill the shallow defects. Next the vane was cooled first in a vacuum to reduce oxidation (to about 1000° F.) then in argon. Cooling the vane to below about 300° F. then enabled the vane to be handled safely before exposing the vane to air. Alternatively, if cleanliness can be maintained, the vane may be vacuum cooled to between about 1,775° F. and about 1,825° F. and force argon cooled to below about 300° F. before exposing the vane to air. The part was visually inspected and more repair coating was added where needed. The above heating/cooling cycle was then repeated to assure that all cracks were filled (this is desirable but not always necessary).

TABLE IV

| Temperature (°F.) | Rate (°F./per minute) | Pressure (torr) | Time (minutes) |
|---|---|---|---|
| Heat Up | ~30 | $<5 \times 10^{-4}$ | — |
| 1,000 ± 25 | — | $<5 \times 10^{-4}$ | 15 |
| Heat Up | >20 | $<5 \times 10^{-4}$ | — |
| 1,800 ± 25 | — | $<5 \times 10^{-4}$ | 10 |
| Heat Up | 10–25 | $<5 \times 10^{-4}$ | — |
| 2,200 ± 15 | — | $<5 \times 10^{-4}$ | 15 |
| Cool Down | Vacuum Cool | $<5 \times 10^{-4}$ | — |
| ~1,000 | — | $<5 \times 10^{-4}$ | — |
| Cool Down | Forced Argon Cool | $<5 \times 10^{-4}$ | — |
| ~300 | | 760 Argon | — |
| Repeat if desired with addition of coating as required | | | |

A diffusion (homogenization) cycle was then performed. As summarized in TABLE V following this detailed description, this cycle included similar steps as above until the vacuum cooling step. Instead of the above vacuum cooling step, a main (or diffusion pump) valve was closed while keeping a roughing pump valve open. A controlled quantity of argon was introduced such that the pressure was maintained between about 1 tort and about 2 torr. This argon was introduced to minimize the vaporization of critical elements of the superalloy, such as chromium. The temperature was held for a total of about 10 hours to sufficiently diffuse boron into the substrate thereby raising the solidification temperature of the melted constituent and enhancing the surface strength of the vane. Argon was then used to cool the vane to below about 1,200° F. at about 40° F. per minute or faster. Cooling continued to below about 300° F. before air exposure. Following this procedure, the part was found to be fully equivalent to a new part.

TABLE V

| Temperature (°F.) | Rate (°F./per minute) | Pressure (torr) | Time (minutes) |
|---|---|---|---|
| Heat Up | ~30 | $<5 \times 10^{-4}$ | — |
| 1,000 ± 25 | — | $<5 \times 10^{-4}$ | 15 |
| Heat Up | >20 | $<5 \times 10^{-4}$ | — |
| 1,800 ± 25 | — | $<5 \times 10^{-4}$ | 10 |
| Heat Up | 10–25 | $<5 \times 10^{-4}$ | — |
| 2,200 ± 15 | — | $<5 \times 10^{-4}$ | 15 |
| 2,200 ± 15 | — | 1–2 Argon | 585 |
| Cool Down | Vacuum Cool | 1–2 Argon | — |
| ~1,000 | — | 1–2 Argon | — |
| Cool Down | Forced Argon Cool | 760 Argon | — |
| ~300 | | 760 Argon | — |

The defects in the example discussed above were small cracks and shallow crevices. If the defects were a combination of small cracks and large deep crevices, which frequently occurs, then the following step would be performed prior to application of the previously described repair coating. Upon cleaning the vane, a paste would be deposited into the deep crevices. This paste comprises the previously discussed filler mix with a significantly higher viscosity and may also have a larger particle size. See U.S. Pat. No. 4,073,639 which is assigned to the present assignee and incorporated herein by reference. After the crevices are filled, the paste is air dried. The component is then heated in a furnace to melt and flow the dried material to fill the crevices, and build up eroded areas to at least their original thickness. After subsequent solidification, the component is then machined into its original dimension. Subsequent grinding and buffing of the component may be necessary.

Once the excess material is removed, the previously discussed repair coating is applied to the small crevices and to the paste filled areas for added component protection.

The metal article in the example discussed above was a Ni based superalloy. If the metal article was a Co based superalloy, the metallic filler mix would have the following constituents.

TABLE VI

First Particulate Component

| Constituent | Weight Percent |
|---|---|
| Carbon | 0.00%–1.50% |
| Manganese | 0.00%–1.00% |
| Silicon | 0.00%–1.00% |
| Chromium | 20.00%–30.00% |
| Nickel | 0.00%–15.00% |
| Tungsten | 0.00%–8.00% |
| Tantalum | 0.00%–6.00% |
| Titanium | 0.00%–1.00% |
| Zirconium | 0.00%–1.00% |
| Iron | 0.00%–3.00% |
| Boron | 0.00%–0.10% |
| Cobalt | Remainder |

TABLE VII

Second Particulate Component

| Constituent | Weight Percent |
|---|---|
| Carbon | 0.00%–1.500% |
| Chromium | 20.00%–30.00% |
| Nickel | 30.00%–40.00% |
| Boron | 1.00%–5.00% |
| Cobalt | Remainder |

In addition, the first heating cycle would be performed at about 2,200° F. to enhance the flow of the repair coating. Then the temperature would be decreased to about 2,100° F. to sufficiently diffuse boron into the substrate thereby raising the solidification temperature of the melted constituent and enhancing the strength of the coating. Then the article would be vacuum cooled to about 1,000° F. to reduce the chance of contamination formation. Argon would then be used to cool the vane to below about 300° F. to enable the article to be handled safely before exposing the vane to air. Alternatively, if cleanliness can be maintained, the article may be vacuum cooled to between about 1,775° F. and about 1,825° F. and argon may then be used to cool the vane to below about 300° F. before exposing the vane to air. The article would then be visually inspected and more repair coating would be added where needed. The above cycle could then be repeated to assure that all cracks were filled.

Advantages of the present invention include the ability to apply thin, adherent durable layers of the repair coating over large areas of a metal article. This process assures complete coverage of defects and minimizes the necessity for rework. The present invention may transform a damaged component with large, deep crevices into essentially the equivalent of a new component. This process results in extended useful life of existing components, fewer scrapped components, and, consequently, significant cost savings.

While the principles and procedures are described herein for use on a turbine vane which required repair, it will be obvious to those skilled in the art that the same repair method and coating could be applied to articles in the original manufacturing process experiencing defects.

Although this invention has been shown and described with respect to detailed embodiments thereof, it will be understood by those skilled in the art that various changes, omissions and additions in form and detail thereof may be made without departing from the spirit and scope of the claimed invention.

We claim:

1. A method of repairing surface and near-surface defects in a superalloy article having a base metal surface such that minimal finishing steps are required to return the article to its proper dimensions, the method comprising the steps of:
   (a) cleaning the base metal surface of the article;
   (b) applying a repair coating to the base metal surface of the article, particularly to any surface and near-surface defects, the repair coating comprising a composition selected from the group consisting of between about 20 weight percent and about 60 weight percent volatile organic carrier and between about 20 weight percent and about 60 weight percent water-based carrier, wherein the repair coating further comprises between about 3 weight percent and about 8 weight percent fluxing agent including a halide compound, between about 1 weight percent and about 5 weight percent thickening agent, balance a metallic filler mix comprising:
      a first finely-divided homogeneous particulate component substantially corresponding in composition to that of the article;
      a second finely-divided homogeneous particulate component having as its base the same base metal as that of the article and containing a melting point depressant in a quantity substantially exceeding that present in the article;
      the first and second particulate components being intimately blended to form a powder mix which has an overall composition approximating that of the article, said first component of the mix remaining solid at a temperature below the melting point of the article, wherein the coating has a paint-like consistency;
   (c) heating the article to a temperature between about 975° F. and about 1,025° F. and holding at the temperature to achieve a uniform temperature throughout the article;
   (d) heating the article to a temperature between about 1,775° F. and about 1,825° F. and holding at the temperature to achieve a uniform temperature throughout the article;
   (e) raising the temperature of the article to a processing temperature below the melting temperature of the article, said processing temperature being just beyond the melting point of the second particulate component such that the second particulate component melts and flows into any surface and near-surface defects while the first particulate component remains solid;
   (f) heating the article to a temperature between about 2,185° F. and about 2,215° F. and holding at the temperature to effect isothermal re-solidification of the mix by diffusion of the melting point depressant into the article and into the first particulate component; and
   (g) continuing exposure of the article to high temperature for homogenization, whereby minimal finishing steps are required to return the article to its proper dimensions.

2. A method of repairing surface and near-surface defects in a superalloy article having a base metal surface such that minimal finishing steps are required to return the article to its proper dimensions, the method consisting essentially of:

(a) cleaning the base metal surface of the article;

(b) applying a repair coating to the base metal surface of the article, particularly to any surface and near-surface defects, the repair coating comprising a composition selected from the group consisting of between about 20 weight percent and about 60 weight percent volatile organic carrier and between about 20 weight percent and about 60 weight percent water-based carrier, wherein the repair coating further comprises between about 3 weight percent and about 8 weight percent fluxing agent including a halide compound, between about 1 weight percent and about 5 weight percent thickening agent, balance a metallic filler mix comprising:

a first finely-divided homogeneous particulate component substantially corresponding in composition to that of the article;

a second finely-divided homogeneous particulate component having as its base the same base metal as that of the article and containing a melting point depressant in a quantity substantially exceeding that present in the article;

the first and second particulate components being intimately blended to form a powder mix which has an overall composition approximating that of the article, said first component of the mix remaining solid at a temperature below the melting point of the article, wherein the coating has a paint-like consistency;

(c) heating the article to a temperature between about 975° F. and about 1,025° F. and holding at the temperature to achieve a uniform temperature throughout the article;

(d) heating the article to a temperature between about 1,775° F. and about 1,825° F. and holding at the temperature to achieve a uniform temperature throughout the article;

(e) raising the temperature of the article to a processing temperature below the melting temperature of the article, said processing temperature being just beyond the melting point of the second particulate component such that the second particulate component melts and flows into any surface and near-surface defects while the first particulate component remains solid;

(f) heating the article to a temperature between about 2,185° F. and about 2,215° F. and holding at the temperature to effect isothermal re-solidification of the mix by diffusion of the melting point depressant into the article and into the first particulate component; and (g) continuing exposure of the article to high temperature for homogenization, whereby minimal finishing steps are required to return the article to its proper dimensions.

3. A method of repairing surface and near-surface defects in a superalloy article such that minimal finishing steps are required to return the article to its proper dimensions, the method comprising the steps of:

(a) cleaning the surface of the article;

(b) applying a repair coating to the article, particularly to any surface and near-surface defects, the repair coating comprising a composition selected from the group consisting of between about 20 weight percent and about 60 weight percent volatile organic carrier and between about 20 weight percent and about 60 weight percent water-based carrier, wherein the repair coating further comprises between about 3 weight percent and about 8 weight percent fluxing agent including a halide compound, between about 1 weight percent and about 5 weight percent thickening agent, balance a metallic filler mix comprising:

a first finely-divided homogeneous particulate component substantially corresponding in composition to that of the article;

a second finely-divided homogeneous particulate component having as its base the same base metal as that of the article and containing a melting point depressant in a quantity substantially exceeding that present in the article;

the first and second particulate components being intimately blended to form a powder mix which has an overall composition approximating that of the article, said first component of the mix remaining solid at a temperature below the melting point of the article, wherein the coating has a paint-like consistency:

(c) heating the article to achieve a uniform temperature throughout the article;

(d) raising the temperature of the article to a processing temperature below the melting temperature of the article, said processing temperature being just beyond the melting point of the second particulate component such that the second particulate component melts and flows into any surface and near-surface defects while the first particulate component remains solid;

(e) holding the article at about the processing temperature to effect isothermal re-solidification of the mix by diffusion of the melting point depressant into the article and into the first particulate component; and (f) continuing exposure of the article to high temperature for homogenization, whereby minimal finishing steps are required to return the article to its proper dimensions.

* * * * *